(12) United States Patent
Mourougaya et al.

(10) Patent No.: US 12,111,229 B2
(45) Date of Patent: Oct. 8, 2024

(54) SYSTEM FOR EVALUATING THE STATE OF THE SURFACE OF A TIRE

(71) Applicant: COMPAGNIE GENERALE DES ETABLISSEMENTS MICHELIN, Clermont-Ferrand (FR)

(72) Inventors: Francois Mourougaya, Clermont-Ferrand (FR); Nicolas Roudel, Clermont-Ferrand (FR); Florian Heck, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 190 days.

(21) Appl. No.: 17/780,140

(22) PCT Filed: Nov. 23, 2020

(86) PCT No.: PCT/FR2020/052147
§ 371 (c)(1),
(2) Date: May 26, 2022

(87) PCT Pub. No.: WO2021/105597
PCT Pub. Date: Jun. 3, 2021

(65) Prior Publication Data
US 2022/0412844 A1    Dec. 29, 2022

(30) Foreign Application Priority Data

Nov. 27, 2019  (FR) ...................................... 1913285

(51) Int. Cl.
*G01M 17/02* (2006.01)
*H04N 23/56* (2023.01)
*H04N 23/90* (2023.01)

(52) U.S. Cl.
CPC ........ *G01M 17/027* (2013.01); *G01M 17/021* (2013.01); *H04N 23/56* (2023.01); *H04N 23/90* (2023.01)

(58) Field of Classification Search
None
See application file for complete search history.

(56) References Cited

U.S. PATENT DOCUMENTS 10,121,238 B2   11/2018   Krolczyk et al.
10,605,698 B2    3/2020   Held et al.
(Continued)

FOREIGN PATENT DOCUMENTS

| EP | 2078955 A1 | 7/2009 |
| EP | 3060899 A1 | 8/2016 |
| EP | 3391011 A1 | 10/2018 |
| FR | 3011079 A1 | 3/2015 |
| WO | 2018/150256 A1 | 8/2018 |

OTHER PUBLICATIONS

International Search Report dated Jan. 19, 2021, in corresponding PCT/FR2020/052147 (9 pages).
(Continued)

*Primary Examiner* — Jefferey F Harold
*Assistant Examiner* — Charles N Hicks
(74) *Attorney, Agent, or Firm* — VENABLE LLP

(57) ABSTRACT

A system for evaluating the surface of a tire (10) comprises: a region (21) for entry of the tire into the system, a capture region, and an exit region (22), distinct from the entry region, means for moving (23) and for holding a tire in position, means for illuminating the tire allowing the illumination of a sidewall of the tire and of the crown of a tire in the capture region, means for acquiring a visual image of the tire in the capture region, and means for processing the acquired image, at least one acquisition means being installed on a shaft that is movable with respect to the tire installed in the capture region.

8 Claims, 3 Drawing Sheets

(56) References Cited

U.S. PATENT DOCUMENTS

| | | |
|---|---|---|
| 10,859,468 B2 | 12/2020 | Taylor et al. |
| 10,935,467 B2 | 3/2021 | Held et al. |
| 11,198,339 B2 | 12/2021 | De Stasio et al. |
| 2001/0040682 A1* | 11/2001 | Lindsay ............... G01B 9/025 356/520 |
| 2005/0264796 A1 | 12/2005 | Shaw et al. |
| 2008/0147347 A1 | 6/2008 | Shaw et al. |
| 2016/0225128 A1 | 8/2016 | Krolczyk et al. |
| 2016/0258842 A1 | 9/2016 | Taylor et al. |
| 2017/0370807 A1 | 12/2017 | Boffa et al. |
| 2018/0364134 A1* | 12/2018 | Held ................... G01M 17/027 |
| 2019/0086293 A1 | 3/2019 | Held et al. |
| 2019/0353560 A1 | 11/2019 | Boffa et al. |
| 2020/0047569 A1 | 2/2020 | De Stasio et al. |
| 2020/0217756 A1 | 7/2020 | Held et al. |

OTHER PUBLICATIONS

J.E. Siegel, et al., "Automotive Diagnostics as A Service: An Artificially Intelligent Mobile Application for Tire Condition Assessment", Robocup 2008: Robot Soccer World Cup XII: [Lecture Notes n Computer Science], Springer Int'l Publishing, pp. 172-184, Robocup (2018).

H. Tada, et al., "Defect Classification on Automobile Tire Inner Surfaces using Convolutional Neural Networks", 2017 Int'l Conf. on Computing, Communication, Control and Automation, IEEE, pp. 1-6 (2017).

* cited by examiner

[Fig 1]
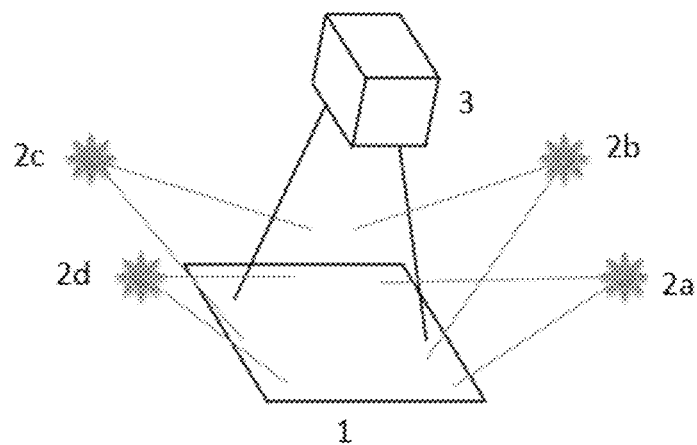
[Fig 2]
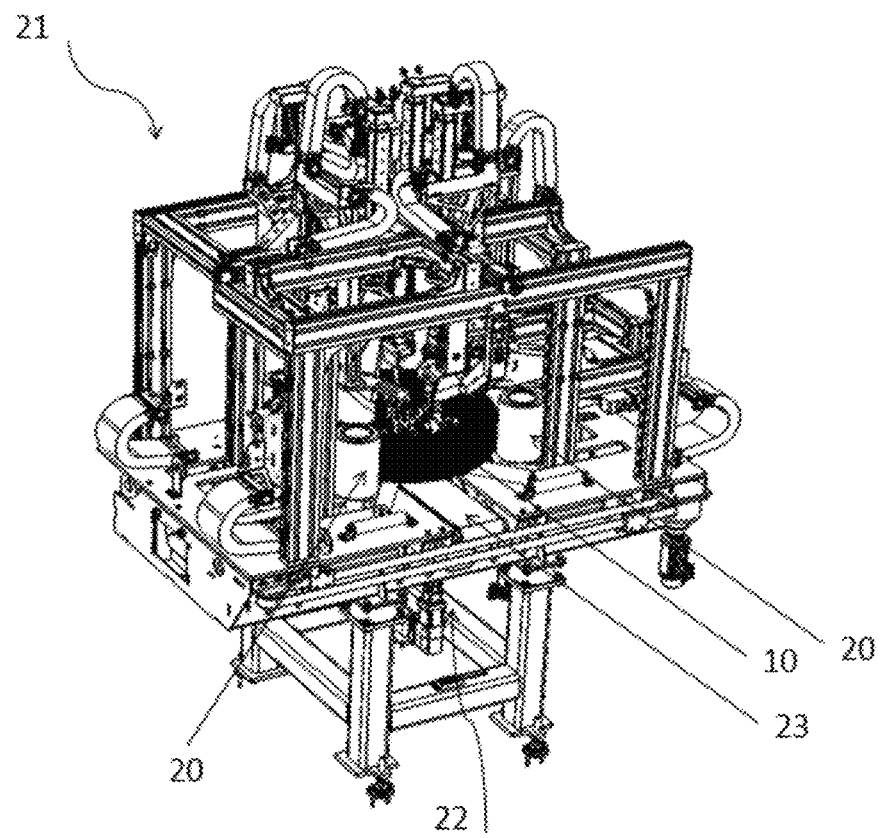

[Fig 3]
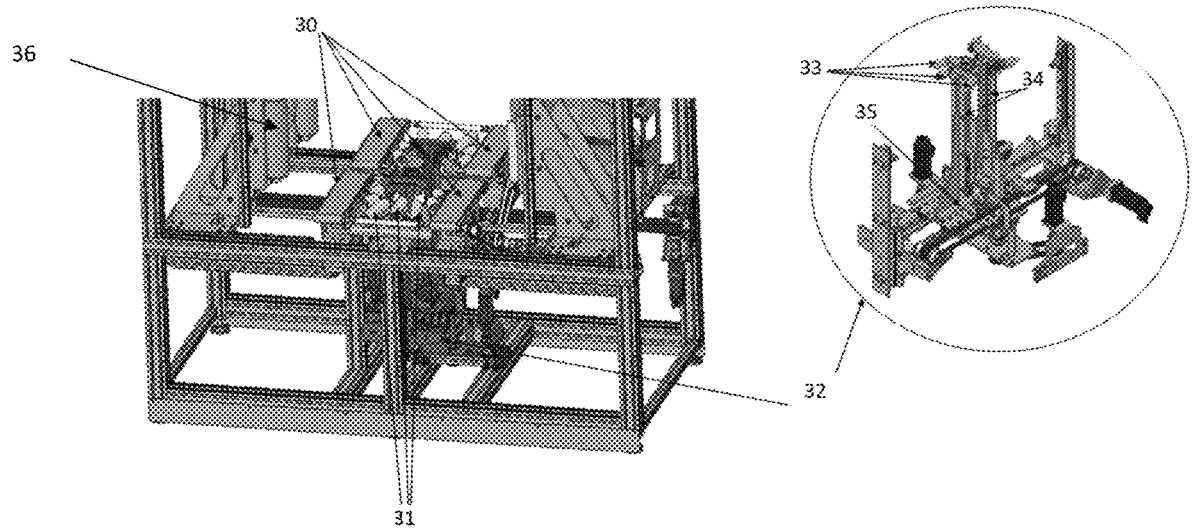
[Fig 4]
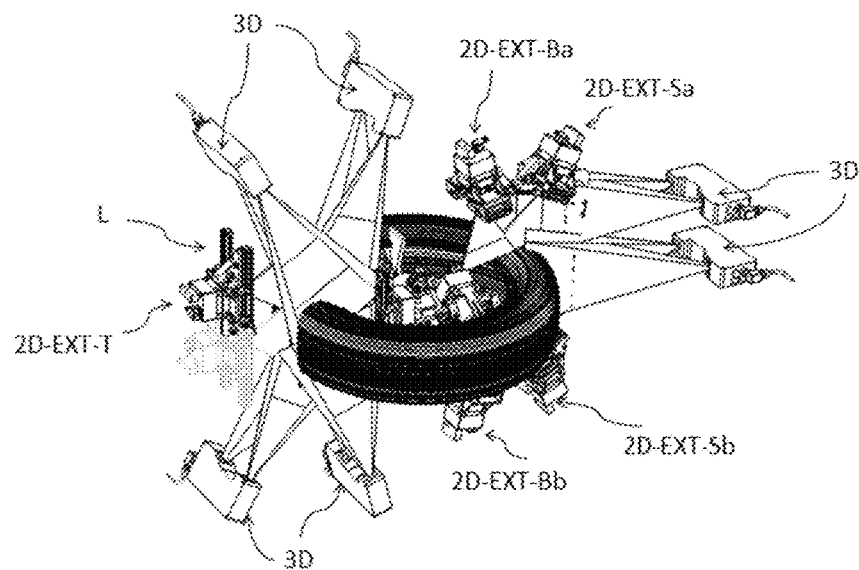

[Fig 5]
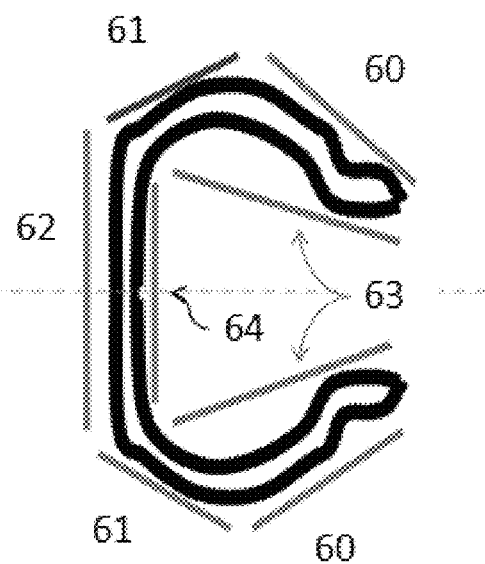
[Fig 6]
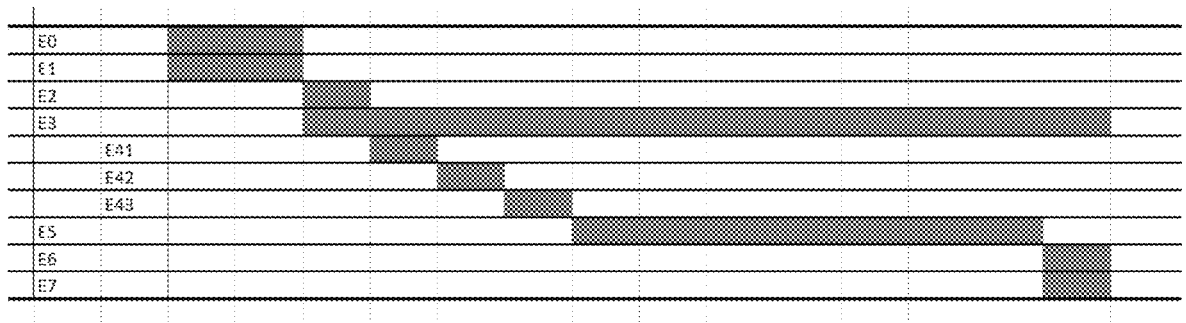

SYSTEM FOR EVALUATING THE STATE OF THE SURFACE OF A TIRE

BACKGROUND

The field of the invention is that of visually inspecting tyres. More specifically, the invention relates to a system for evaluating the state of a tyre by acquiring a visual image of said tyre. Tyres intended to be fitted to wheeled vehicles are generally black in colour due to the use of carbon to strengthen the elastomer mixtures based on which said tyres are produced.

Thus, it is particularly difficult to interpret the images acquired using sensors that are sensitive to the reflection of light off the surface of the tyre. The light effects caused by the relief of the tyre, by grease marks, various other marks, differences in shades of black or by localized discolorations may be easily confused when the raw image provided by a camera is analysed without discernment.

As a result, the ability to correctly detect surface defects such as marks, scratches, missing material or excess material, or the presence or absence of objects in relief or in counter-relief, is highly dependent on the illumination applied to the surface, which will result in various defects being made more or less apparent, in particular depending on the distance and the angle of incidence of the illumination.

Various solutions have been proposed to allow these defects to be detected correctly. Thus, there are acquisition systems commercially available based on the principle of stereophotometry, allowing the visibility of surface structures to be enhanced. It is recalled that stereophotometry is a technique consisting in taking N photographs of one and the same surface under N different lighting conditions.

The use of such a technique is, for example, described in document EP 2 078 955 B1.

However, it is noted that implementing this solution involves the use of several sensors, the bulk of which makes it difficult to integrate them. Now, it is generally desired to be able to install these systems directly at the exit of tyre production lines, which imposes a certain number of constraints in terms of bulk.

In addition, the stereophotometry technique requires knowledge of lighting positions, and thus relatively accurate lighting/tyre relative positioning, as otherwise acquisition and analysis might be skewed.

The aim of the invention is therefore to overcome all of these drawbacks by proposing a complete system for evaluating the surface of a tyre that allows good-quality detection while presenting an acceptable compromise in terms of bulk.

SUMMARY

Thus, the present invention relates to a system for evaluating the surface of a tyre, comprising:
- a region for entry of the tyre into the system, a capture region, and an exit region, distinct from the entry region,
- means for moving and for holding a tyre in position,
- means for illuminating the tyre allowing the illumination of a sidewall of the tyre and of the crown of a tyre in the capture region,
- means for acquiring a visual image of the tyre in the capture region,
- means for processing the acquired image, at least one acquisition means being installed on a movable shaft.

The presence of a region for entry of the tyre that is distinct from the exit region makes it possible to enter a tyre into the system as the previously evaluated tyre is exiting. Thus, cycle time may be saved, and logistics management around the system may be facilitated.

The presence of a movable shaft bearing an acquisition means makes it possible to adapt the system to any tyre size, since the acquisition means may be positioned differently according to the width of the tyre.

In one advantageous embodiment, the invention targets a system that also allows visual inspection of the interior of the tyre using the same means, or similar means. Thus, a system which will be detailed using the figures will show total acquisition of the tyre.

In one embodiment, the means for moving and holding a tyre in position comprise one or more means from among:
- centring means,
- rotating means,
- means for locking the tyre,
- means for linear movement between the entry and exit regions, via the capture region.

The means for linear movement allow the device to be passed through, which means that it is easily integrable into a tyre handling line, for example in a factory for producing tyres.

The centring means make it possible to ensure that the whole of the tyre is imaged. Advantageously, these centring means may be electrical centring means, for example using centring rollers.

In one preferred embodiment, the system further comprises means for spreading the beads of the tyre. Specifically, it has been observed that, for tyres of a certain size, for example HGV tyres, the beads interfere with the insertion of the acquisition means. It is therefore useful to provide means for spreading these beads prior to the insertion of the acquisition and/or illuminating means. These spacers allow the beads to be held in the "open" position for the entire acquisition period, and the beads to be released prior to the exit of the tyre.

In one preferred embodiment, the acquisition means comprise one or more linear cameras, and the illuminating means are arranged outside of the field of acquisition of the one or more cameras. It is specified here that a linear camera is a camera whose sensor takes the form of a line of pixels.

A more specific example will be described later on with the aid of figures.

In one preferred embodiment, a system according to the invention further comprises means for moving the acquisition means. These means allow the cameras to be lowered to the level of the tyre installed in the capture region, and then raised to allow removal of the tyre. The details of these various operations will be described later on using a timing diagram.

Also preferably, the system comprises a half-mirror, installed so as to reflect the image of part of the tyre.

Thus, two differently oriented regions of the tyre may be located in the field of one and the same linear camera. Such a device makes it possible to save space and therefore cost.

In one advantageous embodiment, the illuminating means comprise individual light sources covered with a diffusing material.

Such a material allows the homogeneity of the illumination to be improved and potential shine effects from the surface of the tyre to be decreased. Specifically, uniformity of the illumination is particularly important in the case of a linear acquisition system.

In one advantageous embodiment, the means for illuminating a sidewall of the tyre comprise individual light sources arranged along a curve corresponding approximately to the curvature of a tyre sidewall.

The individual devices are, for example, light-emitting diodes.

In one embodiment, the means for processing the acquired image comprise artificial intelligence means.

Preferably, an artificial intelligence suitable for multiresolution and multimodality is used. In other words, it is possible to apply one and the same processing to images taken according to various modalities, which therefore do not necessarily have the same resolution, without this presenting a problem. This makes it possible to acquire the complete image of the tyre in a single cycle, without taking into account interference between the various sensors. In addition, the use of artificial intelligence makes it possible to omit the stereo reconstruction step which was previously necessary. This therefore makes it possible to save cycle time.

In one embodiment, a system according to the invention comprises means for positioning the acquisition and/or illuminating means.

The invention also relates to a method for evaluating the surface of a tyre using a system according to the invention, the method comprising
  a step of entering the tyre into the evaluation system,
  a step of rotating the tyre in the capture region of the system,
  a step of acquiring visual images of the crown and of the sidewalls of the tyre,
  a step of acquiring, as a tyre is rotated completely, a visual image of the tyre,
  a step of exiting the tyre from the evaluation system,
  the method being characterized in that the step of acquiring a visual image of the tyre is performed while the tyre is rotated by one revolution, and in that the step of exiting the tyre is concomitant with a step of entering another tyre into the system.

Such a method makes it possible to save cycle time since part of a cycle is performed at the same time as or even before the end of the preceding cycle.

In one advantageous embodiment, the method comprises a step of illuminating the sidewalls and the crown of the tyre. This illuminating step will be detailed later on with the aid of figures.

In one advantageous embodiment, a method according to the invention further comprises a step of spreading the beads, prior to the acquisition step.

In one advantageous embodiment, a method according to the invention further comprises a step of processing the acquired image. This processing may take place in parallel with the other steps of the method, since it does not require the tyre to be present in the evaluation system.

The processing comprises a preliminary step of preparing the image.

Thus, if the image is acquired using a stereophotometry method, it is necessary to provide a step of stereo reconstruction of the various image captures. However, this step is unnecessary if the processing means implement artificial intelligence, as previously described.

The preliminary step of preparing the image may also comprise division into sub-images, which allows the processing to be started as soon as possible and thus the cycle time to be reduced. This step may also comprise a registration step.

The processing then comprises a step of evaluating the state of the surface. This step may employ various known image analysis methods, such as deep learning or conventional image processing (filtering, segmentation, etc.).

BRIEF DESCRIPTION OF THE FIGURES

Other exemplary embodiments will be described in a non-limiting manner with the aid of figures, in which:

FIG. 1 shows a diagram of the principle of stereophotometry,

FIG. 2 shows one example of a machine corresponding to a system according to the invention, FIG. 3 shows another example of a machine, particularly suitable for large tyres, FIG. 4 more precisely shows the position of the various cameras allowing the imaging of the tyre, FIG. 5 shows the various regions of the tyre to be illuminated and acquired, FIG. 6 shows a timing diagram of the main steps of a method according to the invention.

DETAILED DESCRIPTION

FIG. 1 shows a surface 1 to be inspected. This surface 1 is illuminated by various light sources 2a, 2b, 2c and 2d. It is specified here that the various light sources are not intended to be turned on at the same time, but in turn, according to a predefined lighting cycle. Specifically, as mentioned previously, the principle of stereophotometry is to make multiple acquisitions, also called captures, of the surface 1 under different lighting conditions, according to the one or more light sources turned on during image capture. To that end, the system of FIG. 1 also comprises an image capture system 3.

FIG. 2 shows a complete view of a machine implemented in a system according to the invention. This machine comprises means for rotating a tyre 10. This machine also comprises means allowing linear movement from the entry region 21 (not visible in the figure) towards the exit region 22 for the tyre. These means comprise, for example, a discharge belt 23.

The machine further comprises centring means, in the form of vertical rollers 20 which grip the tyre and then drive it. The movement of the two pairs is synchronized by a belt. As the tyre enters, its diameter is measured approximately by the entry rangefinder and the rollers are dispatched to this gripping position plus an offset to allow gripping. As this side is approached, the approach of the rollers decelerates to switch to a torque setpoint, providing flexibility for centring and driving.

FIG. 3 shows another example of a machine for receiving a tyre for an acquisition phase.

Said FIG. 3 makes it possible to illustrate another exemplary embodiment of the means for moving the tyre, and also to describe means for spreading the beads for a large tyre.

The various illumination and acquisition means are not shown in this figure, and will not be described. However, the description of these means, provided in the light of FIG. 2, also applies to a machine as shown in FIG. 3.

In this example, the means for rotating a tyre comprise vertical rollers 36, one of which is shown in the figure, allowing the tyre to be driven. This rotation is facilitated by the presence of horizontal rollers 31, located under the tyre when it is in position.

This example also shows four discharge belts 30. Unlike in the preceding figure, which showed only a single belt, here there are four distinct belts. Specifically, in order to use the machine for large tyres, it is necessary to provide means 32 for spreading the beads, which must be inserted at the centre of the tyre.

It is therefore necessary to clear the central space, which dictates positioning the discharge belts to the lateral sides. Several thereof should then be used in order to ensure that removal occurs parallel to the direction of exit from the machine. Furthermore, having two belts on either side, with a spacing therebetween, allows complete sections of the tyre to be freed to allow acquisition of the lower portion of the tyre.

A detailed view of these means 32 is present in the bubble shown in FIG. 3. These means comprise rollers 33 that are movable in translation on two vertical shafts 34. These vertical shafts are, in turn, movable in translation on a horizontal shaft.

When there is no tyre in the machine, the vertical shafts are in the centre and the pins are in the low position, as shown in the figure. When the tyre is put in position, a measurement of the inter-bead gap is performed. If the measurement is smaller than a certain predetermined value, the rollers rise to the bottom point of the upper bead, i.e. the bead furthest from the table, and the vertical shafts move apart so as to exert a pressure on the bead, in order to spread it to the desired opening value. If the measurement is greater than this same predetermined value, the rollers rise to the bottom point of the upper bead and a slight pressure is exerted simply to ensure that the beads are flat during rotation.

The acquisition step is then carried out, and the spreading means then return to their initial position, in order to allow the tyre to be evaluated.

Now described, with the aid of FIGS. 4 and 5, are the various regions of the tyre and the cameras that may be used to perform the various acquisitions.

A tyre may be divided into various regions:
outer regions, such as the sidewalls 60, the shoulders 61, and the tread 62, also referred to as the crown,
inner regions such as the inner sides 63 and the inner ring 64.

For the acquisition of these various regions, both two-dimensional and three-dimensional cameras, also called sensors, are used, which are shown in FIG. 5.

The two-dimensional sensors are used both for the inside and the outside:
sensor 2D EXT T for acquiring the tread 62,
sensor 2D EXT S for acquiring the shoulders 61,
sensors 2D EXT B for acquiring the sidewalls 60.

The sensor for acquiring the inner ring is not visible in FIG. 5.

The sensors for acquiring the inner sides are not referenced.

The three-dimensional sensors are used only for the outer surfaces of the tyre, and are denoted by 3D in FIG. 5. Certain cameras are advantageously provided with illuminating means. These illuminating means take the form of light bars L, each bar being composed of a line of individual light sources, and being oriented so that the illumination is as uniform as possible over the line acquired by a linear camera.

In one example, a camera bears three or four light bars, which turn on in turn according to a predetermined cycle. Thus, the camera may produce, in one step, three or four different images, which makes it possible to apply a stereo-photometry principle, as already described.

In one exemplary embodiment, the cameras 2D-EXT-Ba and 2D-EXT-Sa located below the tyre are in a fixed position, and the tyre is positioned correctly relative to these cameras. Conversely, the cameras 2D-EXT-Bb and 2D-EXT-Sb located above the tyre are installed on a movable shaft, so as to be able to descend to a correct acquisition position, according to the width of the tyre.

Furthermore, in one embodiment, the positioning of the inner cameras, allowing acquisition of the inner sides and of the inner ring, may be performed automatically as a tyre enters into the capture region. To that end, a system according to the invention comprises a rangefinder for determining the position of a significant point on the tyre, for example the radially innermost point on the tyre, namely the end of the bead intended to be in contact with a rim seat during mounting of the tyre.

Determining this point allows the various inner cameras to be positioned in height and radius. In one example, the camera for acquiring the inner ring is positioned mid-height with respect to this significant point, starting from the zero ordinate corresponding to the table on which the tyre is positioned in the capture region.

Now described, using the timing diagram of FIG. 6, will be the various steps of a method according to the invention allowing the objectives of the invention to be achieved, namely performing a complete visual inspection in a shortest possible cycle time.

The first step E1 consists in entering a tyre into a system according to the invention. As shown in the timing diagram, this step E1 may be concomitant with a step E0 corresponding to the exit, or removal, of the preceding tyre.

Upon completion of this step E1, a step E2 consists in locking the tyre in a centred position.

Step E3 of rotating the tyre starts at the same time as the centring step, and lasts until the end of the acquisition cycle.

Next comes a macro-step E4 of positioning the various sensors. This macro-step comprises various sub-steps for each of the sensors. Here, the successive sub-steps corresponding to one sensor are described:
a sub-step E41 of lowering the sensor at high speed,
a sub-step E42 of lowering the sensor at low speed.

These two sub-steps make it possible to achieve the trade-off inherent to the present invention, namely the speed/quality trade-off. Thus, it starts by rapidly lowering the sensor to the vicinity of the region where it is to be located, and then shifts to a low speed to precisely adjust the position.

A sub-step E43 of adjusting the sensor diameter-wise, i.e. no longer a vertical movement as in sub-steps E41 and E42, but an axial movement in order to adapt to the diameter of the tyre to be evaluated.

These three sub-steps are the same for all of the inner sensors.

Conversely, the external sensors, the position of which is easier, may be lowered at a constant speed.

In addition, as mentioned above, some sensors do not move, since they are in a fixed position in the evaluation system.

Next comes the acquisition step E5 itself, also called inspection.

Next comes a step E6 corresponding to the raising of the various sensors. In parallel to this step E6 is a step E7 of releasing the centring means.

The step of exiting the tyre is not described at the end of the timing diagram because it was at the start, under the reference E0.

The invention claimed is:

1. A system for evaluating the surface of a tire, the system comprising:
    a region for entry of the tire into the system, a capture region, and an exit region, distinct from the entry region;
    means for moving and for holding a tire in position comprising one or more means selected from the group consisting of means for centering the tire comprising a centering roller, means for rotating the tire comprising a vertical roller, means for locking the tire comprising the vertical roller or a vertical shaft, and means for linear movement of the tire between the entry and exit regions, via the capture region, comprising a discharge belt;
    means for illuminating the tire comprising one or more light sources, the means for illuminating the tire allowing the illumination of a sidewall of the tire and of a crown of the tire in the capture region;
    means for acquiring a visual image of the tire in the capture region comprising one or more cameras;
    means for automatically positioning the one or more cameras, as a tire enters into the capture region, comprising a rangefinder; and
    means for processing the acquired image comprising a deep learning system or a conventional image processing system,
    wherein at least one acquisition means is installed on a shaft that is movable with respect to the tire installed in the capture region.

2. The system according to claim 1 further comprising means for spreading beads of the tire comprising the vertical shaft.

3. The system according to claim 1, wherein the at least one acquisition means comprise one or more linear cameras, and
    wherein the illuminating means are arranged outside of a field of acquisition of the one or more linear cameras.

4. The system according to claim 1, wherein the illuminating means comprise individual light sources covered with a diffusing material.

5. The system according to claim 1, wherein the means for illuminating the sidewall of the tire comprise several lines of individual light sources.

6. The system according to claim 1, wherein the means for processing the acquired image comprise artificial intelligence means.

7. The system according to claim 1 further comprising a half-mirror, installed so as to reflect an image of part of the tire.

8. A method for evaluating the surface of a tire using the system according to claim 1, the method comprising the steps of:
    entering the tire into the evaluation system using a discharge belt;
    acquiring a visual image of the tire using one or more cameras; and
    exiting the tire from the evaluation system using the discharge belt,
    wherein the step of acquiring a visual image of the tire is performed while the tire is rotated by one revolution, and
    wherein the step of exiting the tire is concomitant with a step of entering another tire into the system.

* * * * *